Figure 1:
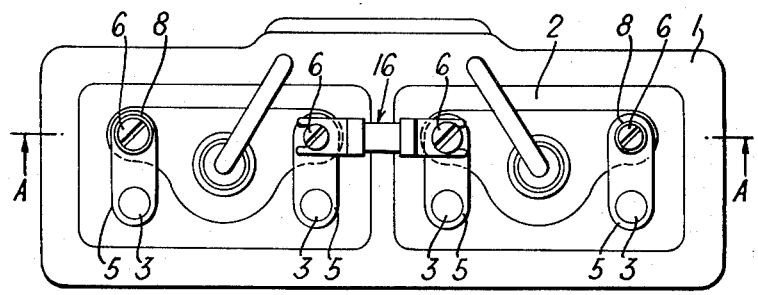

Sept. 21, 1965  W. H. WILKINSON  3,207,634

ELECTRIC ACCUMULATOR CELLS

Filed July 12, 1962

*Inventor*
WILLIAM H. WILKINSON

By *Imirie and Smiley*
*Attorneys*

United States Patent Office 3,207,634
Patented Sept. 21, 1965

3,207,634
ELECTRIC ACCUMULATOR CELLS
William H. Wilkinson, Denton, Manchester, England, assignor to Oldham & Son Limited, Manchester, England, a British company
Filed July 12, 1962, Ser. No. 209,440
Claims priority, application Great Britain, July 17, 1961, 25,826/61, Patent 958,281
9 Claims. (Cl. 136—135)

This invention relates to electric accumulator cells and in particular to a terminal arrangement therefor.

It has been proposed to provide electric accumulator cells with lids so constructed that a cell post extends through a compound-receiving recessed portion of the lid, the post being connected with an electrically conductive link which is held in position by a screw threaded into a metal bush moulded into the lid and spaced from the post, the bush being protected against electrolytic corrosion from the interior of the cell.

It sometimes happens, however, that acid is spilled on the top of the lid and when this occurs there may be corrosion of the metal bush. It is a main object of the present invention to provide a lid of the kind mentioned above but in which the bush is not subject to acid corrosion either from the inside or the outside of the cell and which renders unnecessary the moulding of the bush into the lid.

According to the invention there is provided a terminal arrangement for an electric accumulator cell, comprising a moulded insulating lid, cell posts extending through the lid, sealing compound sealing the cell posts in the lid, internally screw-threaded bushes made of an acid-resistant material and each inserted axially into and freely removable from a hole moulded in the lid and which extends from the outer face of the lid towards but not through the inner face of the lid and which is spaced from a cell post, electrically conductive links connected one with each cell post, and screws threaded one into each bush and co-operating with the links to retain the links in position relative to the cell posts, each said bush being shaped in a manner such that frictional engagement between the bush and the hole into which it is inserted constrains the bush against rotation about its axis when the screw is threaded into the bush by pressure exerted thereon by a screwdriver.

The bush may be made of an artificial plastic material which may be polyvinyl chloride, and the bush may be provided with peripheral longitudinal flutes the ridges of which co-operate with the sides of the bush-receiving hole to constrain the bush against axial rotation relative thereto.

In one embodiment of the invention the bush is a free fit in the hole and the length of the bush is greater than the depth of the hole whereby friction between the bottom of the hole and the bottom of the bush when screwing the screw thereinto prevents rotation of the bush about the axis thereof.

Figure 2:
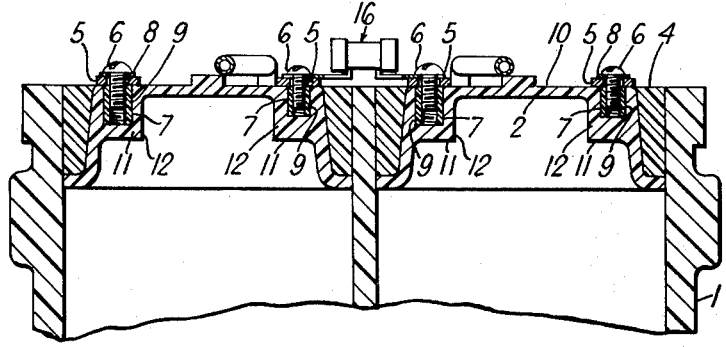
Figure 3:
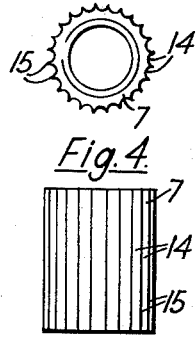
Figure 4:
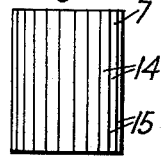
Figure 5:
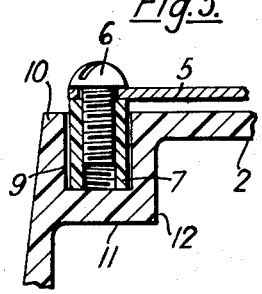

In order that the invention may be clearly understood one embodiment thereof will now be described, by way of example, with reference to the accompanying drawings, in which:

FIGURE 1 is a top plan of an accumulator having fitted thereto a terminal arrangement according to the invention,
FIGURE 2 is a section on line A—A, FIGURE 1,
FIGURE 3 is a top plan of a bush fitted in the lid,
FIGURE 4 is a side elevation of the bush, and
FIGURE 5 illustrates a modified form of the invention.

Referring to FIGS. 1 to 4, an accumulator 1, FIGURE 1, has an insulating moulded lid 2 fitted thereto in the usual manner. A terminal post 3, FIGURE 1, extends through the cover in the usual manner and a recess, as is customary, is filled with a sealing compound 4, FIGURE 2. The post 3 has an electrically conductive link 5 connected thereto and the link is held in position by a screw 6 threaded into a bush 7. A washer 8 ensures electrical connection between the link 5 and screw 6, and the link is provided with a loop or other device, not shown, by which an external lead, also not shown, may be connected to the post 3.

The bush 7 is made of an acid-resistant material, preferably an artificial plastic material such as polyvinyl chloride or reinforced styrene, and is pressed axially into a hole 9 which extends from the outer face 10 of the lid towards but not through the inner face 11 of the lid. The hole 9 is formed during moulding of the lid and is formed in a boss 12, the bottom, or inner, portion of which, being imperforate, prevents electrolyte from entering the bush 7.

The bush 7, which is provided with screw threads to receive the screw 6, is shaped in a manner such that frictional engagement between the bush and the hole constrains the bush against rotation about its axis when the screw 6 is screwed into the bush by a screwdriver and to this end the bush may be of any desired cross-section. As illustrated in FIGURES 3 and 4, however, the bush is of circular cross-section and is provided with peripheral longitudinal flutes 14 the ridges 15 of which frictionally co-operate with the sides of the hole 9 to constrain the bush against axial rotation relative to the hole during rotation of the screw 6 therein by a screwdriver. If desired, the sides of the hole may have longitudinal ribs to co-operate with the flutes of the bush but this is found not to be essential because by suitable selection of the diameter of the bush it is found that the ridges 15 so frictionally grip the sides of the hole as to prevent rotation of the bush about its axis and the entry of the screw 6 into the bush tends to increase the frictional grip of the bush against the sides of the hole.

In an alternative embodiment of the invention, FIG. 5, the shaping of the bush to constrain it against rotation about its axis when the screw is threaded into the bush, consists in making the bush of circular cross-section, with or without peripheral ribs as described above, but also in making the bush a free fit in the hole 9 and with a length which is greater than the depth of the hole 9. The length of the bush may exceed the depth of the hole by about $\frac{1}{32}$ inch. With this form of bush it is found that when threading the screw into the bush the friction between the bottom of the hole and the bottom of the bush prevents rotation of the bush about the axis thereof. It will be understood that the bush cannot be displaced from the hole because the link 5 is anchored to the terminal post 3.

It will also be understood that because the bush is located in a blind hole in the lid it cannot be engaged by electrolyte in the cell and because it is made of acid-resistant material it is not subject to corrosion by acid which may be spilled on to the top of the lid.

The cells of the accumulator are connected in known manner by a connecting link and fuse indicated generally by the reference 16.

I claim:

1. A terminal arrangement for an electric accumulator cell, comprising a moulded insulating lid, cell posts extending through the lid, sealing compound sealing the cell posts in the lid, internally screwthreaded bushes made of an acid resistant material and each inserted axially into and freely movable from a hole moulded in the lid and which extends from the outer face of the top of the lid towards but not through the inner face of the lid and which is spaced from a cell post, electrically conductive links connected one with each cell post, and screws threaded one into each bush and co-operating with the links to retain the links in position relative to the cell posts, each said bush being shaped in a manner such that frictional engagement between the bush and the hole into which it is inserted constrains the bush against rotation about its axis.

2. A terminal arranged for an electric accumulator cell, comprising a moulded insulating lid, cell posts extending through the lid, sealing compound sealing the cell posts in the lid, internally screwthreaded bushes made of an acid resistant material and each inserted axially into and freely removable from a hole moulded in the lid and which extends from the outer face of the top of the lid towards but not through the inner face of the lid and which is spaced from a cell post, electrically conductive links connected one with each cell post, and screws threaded one into each said bush and co-operating with the links to retain the links in position relative to the cell posts, each said bush being provided with peripheral longitudinal flutes the ridges of which co-operate with the sides of the hole into which it is inserted to effect frictional engagement therewith and constrain the bush against rotation about its axis.

3. A terminal arrangement for an electric accumulator cell, comprising a moulded insulating lid, cell posts extending through the lid, sealing compound sealing the cell posts in the lid, internally screwthreaded bushes made of an acid resistant material and each inserted axially into and freely removable from a hole moulded in the lid and which extends from the outer face of the top of the lid towards but not through the inner face of the lid and which is spaced from a cell post, electrically conductive links connected one with each cell post, and screws threaded one into each said bush and co-operating with the links to retain the links in position relative to the cell posts, each said bush being a free fit in the hole into which it is inserted and having a length greater than the depth of the hole whereby pressure exerted axially of the bush creates friction between the bottom of the hole and the bottom of the bush to prevent rotation of the bush about the axis thereof.

4. A terminal arrangement according to claim 1, wherein the bush is made of artificial plastic material.

5. A terminal arrangement according to claim 4, wherein the bush is made of polyvinyl chloride.

6. A terminal arrangement according to claim 2, wherein the bush is made of artificial plastic material.

7. A terminal arrangement according to claim 6, wherein the bush is made of polyvinyl chloride.

8. A terminal arrangement according to claim 3, wherein the bush is made of artificial plastic material.

9. A terminal arrangement according to claim 8, wherein the bush is made of polyvinyl chloride.

References Cited by the Examiner

UNITED STATES PATENTS 2,509,298   5/50   Gray et al.

FOREIGN PATENTS 627,681   8/49   Great Britain.
728,946   4/55   Great Britain.

JOHN H. MACK, *Primary Examiner*.